US011898308B2

(12) United States Patent
Benedek et al.

(10) Patent No.: US 11,898,308 B2
(45) Date of Patent: *Feb. 13, 2024

(54) PROCESS TO RECOVER A PORTION OF POST-RECYCLING MUNICIPAL SOLID WASTE

(71) Applicant: ANAERGIA INC., Burlington (CA)

(72) Inventors: Andrew Benedek, Rancho Santa Fe, CA (US); Yaniv D. Scherson, Carlsbad, CA (US); Hans Frederick Ouellet, San Diego, CA (US); Juan Carlos Josse, Aliso Viejo, CA (US)

(73) Assignee: ANAERGIA INC., Burlington (CA)

(*) Notice: Subject to any disclaimer, the term of this patent is extended or adjusted under 35 U.S.C. 154(b) by 58 days.

This patent is subject to a terminal disclaimer.

(21) Appl. No.: 16/985,654

(22) Filed: Aug. 5, 2020

(65) Prior Publication Data
US 2020/0362513 A1    Nov. 19, 2020

Related U.S. Application Data

(63) Continuation of application No. 15/867,224, filed on Jan. 10, 2018, now Pat. No. 10,774,470.
(Continued)

(51) Int. Cl.
*D21B 1/34* (2006.01)
*D21B 1/02* (2006.01)
(Continued)

(52) U.S. Cl.
CPC ............. *D21B 1/345* (2013.01); *B09B 3/00* (2013.01); *B09B 5/00* (2013.01); *D21B 1/026* (2013.01);
(Continued)

(58) Field of Classification Search
CPC .......... D21H 11/14; D21B 1/026; D21B 1/32; D21B 1/08; D21B 1/10; D21B 1/30;
(Continued)

(56) References Cited

U.S. PATENT DOCUMENTS 3,549,529 A * 12/1970 Wiseman ............ C02F 11/08
                                                                210/761
4,153,514 A    5/1979 Garrett et al.
(Continued)

FOREIGN PATENT DOCUMENTS

DE    3934478 A1    4/1991
EP    1207040 B1    7/2005
(Continued)

OTHER PUBLICATIONS

Chen et al., "Pyrolysis Technologies for Municipal Solid Waste: A Review," Waste management, Dec. 2014, vol. 34 (12), pp. 2466-2486.
(Continued)

*Primary Examiner* — Eric Hug
(74) *Attorney, Agent, or Firm* — Borden Ladner Gervais LLP; Michael Damiani

(57) ABSTRACT

This specification describes a system and process for treating waste, for example municipal solid waste (MSW) or post-recycling municipal solid waste. The system includes a press and a pulper. The press is adapted to provide a wet fraction of the waste suitable for anaerobic digestion and rejects. The pulper is adapted to receive the rejects and produce pulp. The pulper may be, for example, a drum pulper. In the process, waste is separated into a press into an organic fraction and rejects. The organic fraction is treated by way of anaerobic digestion. The rejects are separated, optionally in a drum pulper, to produce a fraction containing pulp. The pulp can be re-used to make paper or other
(Continued)

products. In some case, 70% or more or 80% or more of MSW can be diverted from landfill.

12 Claims, 1 Drawing Sheet

Related U.S. Application Data

(60) Provisional application No. 62/445,347, filed on Jan. 12, 2017.

(51) Int. Cl.
  *D21H 11/14* (2006.01)
  *B09B 3/00* (2022.01)
  *D21B 1/32* (2006.01)
  *B09B 5/00* (2006.01)

(52) U.S. Cl.
  CPC .............. *D21B 1/32* (2013.01); *D21H 11/14* (2013.01); *Y02W 30/64* (2015.05)

(58) Field of Classification Search
  CPC . D21B 1/34; D21B 1/345; D21D 5/06; D21D 99/00; B09B 3/00; B09B 3/0016; B09B 5/00; Y02W 30/50; Y02W 30/64; Y02W 30/06; Y02W 30/80
  USPC ............................................................ 162/4
  See application file for complete search history.

(56) References Cited

U.S. PATENT DOCUMENTS

| | | | |
|---|---|---|---|
| 5,316,621 A | 5/1994 | Kitao et al. | |
| 5,387,267 A | 2/1995 | Warf et al. | |
| 6,017,475 A | 1/2000 | Cantrell | |
| 8,877,468 B2 | 11/2014 | Lewis | |
| 11,123,778 B2* | 9/2021 | Benedek | F23G 5/027 |
| 2008/0020456 A1 | 1/2008 | Choate et al. | |
| 2010/0021980 A1 | 1/2010 | McDonald et al. | |
| 2011/0095245 A1 | 4/2011 | Munson et al. | |
| 2013/0316428 A1* | 11/2013 | Gonella | C12P 1/04 |
| | | | 435/170 |
| 2016/0346788 A1 | 12/2016 | Josse et al. | |
| 2019/0091739 A1 | 3/2019 | Benedek et al. | |

FOREIGN PATENT DOCUMENTS

| | | |
|---|---|---|
| EP | 1568478 B1 | 12/2012 |
| IT | TO20111068 A1 | 5/2013 |
| WO | 2013032516 A1 | 3/2013 |
| WO | 2015050433 A1 | 4/2015 |
| WO | 2015053617 A1 | 4/2015 |

OTHER PUBLICATIONS

European Patent Application No. 18738579.4, Extended European Search Report dated Oct. 15, 2020.
International Patent Application No. PCT/CA2017/050336, International Preliminary Report on Patentability dated Sep. 18, 2018.
International Patent Application No. PCT/CA2017/050336, International Search Report and Written Opinion dated Jun. 22, 2017.
International Patent Application No. PCT/CA2018/050019, International Preliminary Report on Patentability dated Jul. 16, 2019.
International Patent Application No. PCT/CA2018/050019, International Search Report and Written Opinion dated Apr. 19, 2018.
Romero-Guiza et al., "Implementation of a Prototypal Optical Sorter as Core of the New Pre-treatment Configuration of a Mechanical-biological Treatment Plant Treating OFMSW Through Anaerobic Digestion," Applied Energy, Dec. 2014, vol. 135, pp. 63-70.
The Dupps Company, Continuous Hydrolyzor Product Brochure, 2016, 2 pages.
U.S. Appl. No. 15/705,704, Non-Final Office Action dated Jul. 20, 2020.
U.S. Appl. No. 15/867,224, Final Office Action dated Jan. 15, 2020.
U.S. Appl. No. 15/867,224, Non-Final Office Action dated Aug. 6, 2019.
U.S. Appl. No. 15/867,224, Notice of Allowance dated Aug. 18, 2020.
U.S. Appl. No. 15/867,224, Notice of Allowance dated May 6, 2020.
U.S. Appl. No. 15/705,704, Restriction Requirement dated Feb. 28, 2020.
U.S. Appl. No. 15/705,704, Final Office Action dated Jan. 15, 2021.
U.S. Appl. No. 15/705,704, Final office Action dated Apr. 4, 2022.
U.S. Appl. No. 15/705,704, Advisory Office Action dated Mar. 12, 2021.
U.S. Appl. No. 15/705,704, Non-Final Office Action dated Jul. 1, 2021.
U.S. Appl. No. 15/705,704, Non Final office action dated Sep. 14, 2022.
Jank et al., "Waste Separation Press (WSP): A Mechanical Pretreatment Option for Organic Waste From Source Separation," Waste Management, 2015, vol. 39, pp. 1-7.
U.S. Appl. No. 15/705,704, Final Office Action dated Apr. 19, 2023.
Canadian Patent Application No. 3049279 Office Action dated Oct. 12, 2023.

* cited by examiner

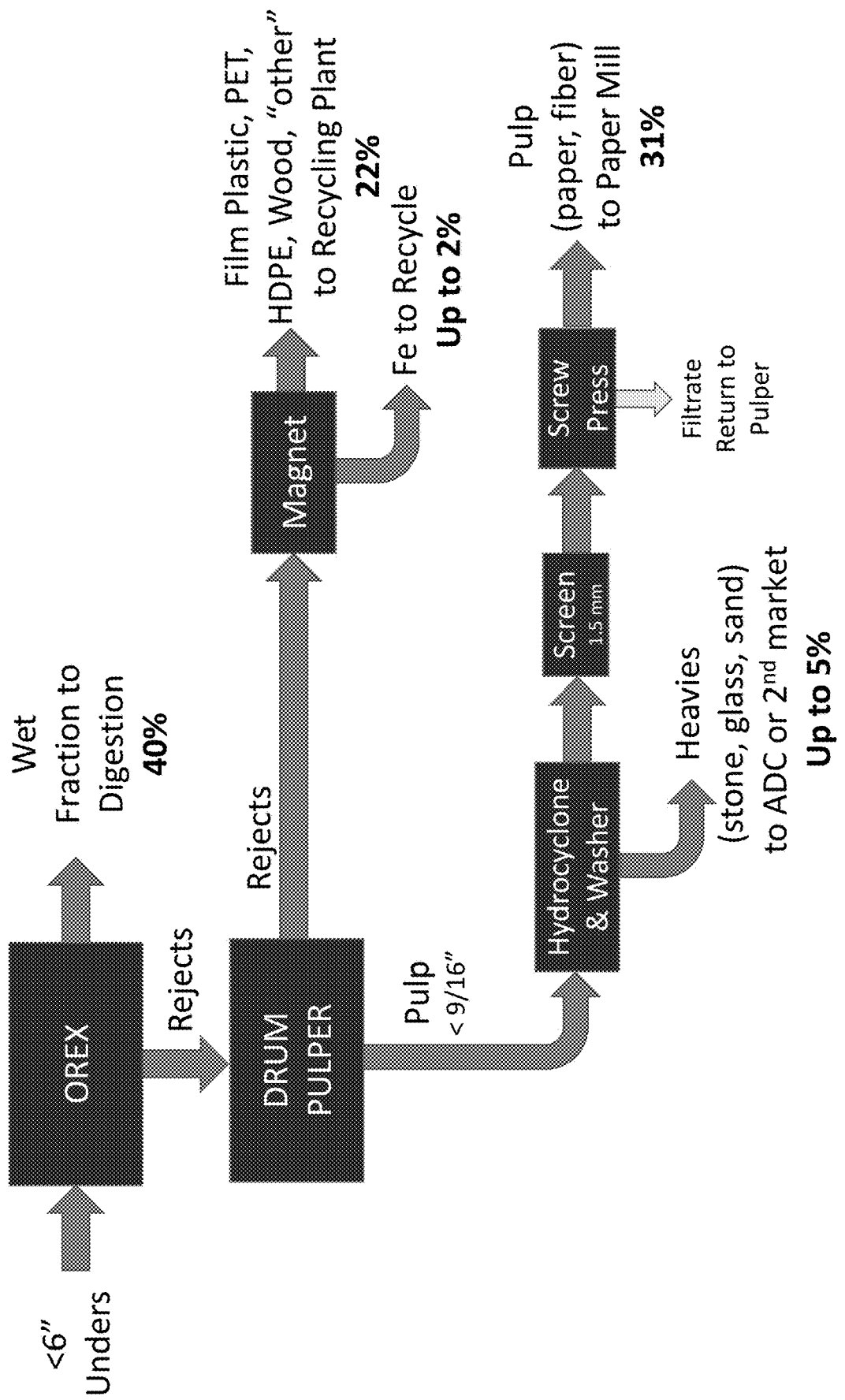

PROCESS TO RECOVER A PORTION OF POST-RECYCLING MUNICIPAL SOLID WASTE

RELATED APPLICATIONS

This application is a continuation of U.S. application Ser. No. 15/867,224, Process to Recover a Portion of Post-Recycling Municipal Solid Waste, filed on Jan. 10, 2018, which claims the benefit of U.S. Provisional Patent Application No. 62/445,347, Process to Recover a Portion of Post-Recycling Municipal Solid Waste, filed on Jan. 12, 2017, which is incorporated herein by reference.

FIELD

This specification relates to solid waste processing.

BACKGROUND

Solid waste can be divided into various fractions distinguished, among other things, by how easily they can be biodegraded. The organic fraction is the part of the waste that is most easily biodegraded and may also be referred to as organic waste. The organic fraction is primarily made up of food waste, but may also include leaf and yard waste or other materials. The organic fraction is approximately 40% of ordinary municipal solid waste (MSW) after recyclables are removed.

Historically, organic waste was landfilled with other solid waste. However, the organic fraction of solid waste is the major cause of greenhouse gas emissions, leachate and odors in landfills. There is a general trend to divert organic waste for biological treatment, for example by anaerobic digestion (AD) or composting. Most biological treatment steps require some preprocessing of the waste such as debagging and sorting to remove large items such as bottles and cans. Certain biological treatments, such as some composting methods and high-solids slurry and wet (low solids) anaerobic digestion, also require that the waste be reduced in size and homogenized. The size reduction is typically done in a device that comminutes the waste, such as a hammer mill, shredder or pulper. In some cases, the comminuting device also provides a coarse separation of contaminants (i.e. material that is not readily biodegraded, such as plastic). Alternatively, a separate separation device may be added.

Wet anaerobic digestion is typically performed in one or more mixed tanks. These systems are entirely contained and so allow for high levels of odor control and biogas recovery. In many cases, the organic waste can also be co-digested with wastewater treatment plant (WWTP) sludge by modifying existing WWTP digesters rather than building new facilities.

US Publication 2013/0316428 describes an alternative process in which an organic fraction containing biological cells is separated from solid waste in a press. The organic fraction is extruded through a grid having small-bore holes, under a pressure higher than the burst pressure of the cell membranes. The cells are disrupted and a gel or paste of a doughy consistency is produced. The gel can be digested in an anaerobic digester. The press may be as described in European Publication Nos. 1207040 and 1568478 and Italian patent publication ITTO20111068. In general, these presses use a plunger to compress waste that has been loaded into a cylinder. The sides of the cylinder are perforated with radial holes. US Publication 2013/0316428, European Publication Nos. 1207040 and 1568478 and Italian patent publication ITTO20111068 are incorporated herein by reference.

INTRODUCTION

This specification describes a system and process for treating waste, for example mixed municipal solid waste (MSW) or post-recycling mixed municipal solid waste.

The inventors have observed that methods as described above do not divert large amounts of mixed MSW from landfill in all cases. Comminuting devices treating MSW do not, generally speaking, produce high quality products. Presses may divert, for example, 20-30% of the mass of mixed MSW for efficient anaerobic digestion, but this still leaves a large portion of the MSW for landfill.

A system described herein includes a press and a pulper. The press is adapted to provide a wet fraction of the waste suitable for anaerobic digestion and rejects. The pulper is adapted to receive the rejects and produce pulp. The pulper may be, for example, a drum pulper.

In a process described herein, waste is separated into a press into an organic fraction and rejects. The organic fraction is treated by way of anaerobic digestion. The rejects are separated, optionally in a drum pulper, to produce a fraction containing pulp.

Whereas treating mixed MSW with a pulper produces a low quality pulp, treating press rejects with a pulper produces pulp with fewer contaminants. Combining significant diversion of organic material via the press to an anaerobic digester with further recovery of pulp diverts a significant amount of MSW from landfill. The pulp can be re-used to make paper or other products. Anaerobic digestion of the wet fraction produces biogas for fuel and optionally other products.

BRIEF DESCRIPTION OF THE FIGURES

FIG. 1 is a schematic process flow diagram of a waste processing system.

DETAILED DESCRIPTION

Recovery or large pieces of recyclable materials (i.e plastics, metals, cardboard and paper) from mixed municipal solid waste MSW is a well-established practice. There are several material recovery facilities (MRFs) that process mixed MSW as opposed to single stream waste, which is separated for recycling at the source. These facilities are known in the industry as "dirty MRFs". Several mechanical processes are used to recover recyclables from mixed waste. These processes include bag openers, shredders, screening, ballistic separators, wind sifters, optical sorters, magnets, Eddy Current separators, and manual sorting. Removing and then recycling metals, OCC, paper and plastics results typically in 10 to 15% diversion of mixed MSW from landfill.

Mixed MSW also contains food waste and other organic materials. Typically the vast majority of the food waste contained in MSW passes through 6 to 10-inch (coarse) trommel or disc screens, along with other materials that do not have recycling value or that escaped the recycling process upstream. These materials include mixed and soiled paper, broken glass, textiles, grit and stones, wood, plastic film, and small size ferrous and non-ferrous metals. Non-recyclable paper and other fibers can account for as much as 20 to 30% of the coarse screening under fraction.

Wet organics can be recovered from the mixed MSW under fraction using an extrusion press as described for example in the patent publications described in the background section above. The coarse screen under fraction is suitable to feed to one or more commercially available presses such as an Organics Extrusion Press OREX400, 500 or 1000 press sold by Anaergia. The extrusion press applies pressure on the waste in a confined extrusion chamber that contains perforations. A portion of the organic waste fluidizes under pressure and exits through the orifices to produce a paste-like material. This paste-like material, which may be called a wet fraction, is a suitable feedstock for anaerobic digestion (AD) or composting. The balance of the material fed to the press exits as rejects. Organics recovery for digestion achieve by way of the press provides an additional 20 to 30% diversion in typical North American mixed MSW.

Many municipalities throughout North America and other parts of the world require higher diversion of mixed MSW from landfill than what traditional "dirty MRF" recycling can achieve even when coupled with organics extraction for AD or composting. While the press rejects could be further processed into refuse derived fuel (RDF) for use as fuel for power generation or cement kilns, thermal solutions such as this are not accepted as landfill diversion in many communities, for example because of the carbon dioxide or other emissions associated with these applications.

The press rejects can contain up to 40% of paper and pulpable fibers with no conventional recyclable value. However, after extracting food waste with the press, the press rejects can be fed to a pulper, for example a drum or tub pulper as used in the pulp and paper industry, to recover the fibers in the paper and other cellulosic materials in the rejects. In one example, a continuous drum pulper is used. The press rejects may be fed directly to the pulper after being extracted from the press.

The press rejects from treating mixed MSW are typically in the form of clumps with 40 to 45% moisture content. The rejects are diluted near at the inlet end of the drum pulper to about 20% solids with recirculated water heated to about 45 degrees C. The drum pulper produces a tumbling effect at its inlet end that, after approximately 15 minutes, creates pulp. The rotary drum of the pulper also contains a screening section at its outlet end. In this section the material is diluted to 4% solids and is washed as it is screened. The screen, for example with 15 mm holes, allows the pulp to exit. Along with the pulp, some grit, plastics and other non-pulpable materials smaller than 15 mm in size exit the screen. The screen overs exit at the end of the screen as washed pulper rejects. The pulp slurry that exits through the screen holes is preferably further cleaned to produce a pulp suitable for use in one or more paper product such as backing board, cardboard, pressed cardboard dividers, etc. The further cleaning, alternatively called polishing, can consist of removing grit and metals in hydrocyclones with dilution to about 3% solids and further screening, for example to 1.5 mm or, depending on the pulp application, down to as low as 200 microns. After cleaning in screens, the low (i.e. about 3%) solids pulp can be dewatered, for example using a screw press. A screw press produces an about 30% solids paper pulp cake that can be transported, for example in 1 ton supersacks, for use as feedstock in pulp and paper mills. The screw press filtrate can be used as dilution water in one or more of the pulping, screening and grit removal unit processes. Optionally, the filtrate may treated with dissolved air flotation to remove suspended solids be fore reuse, which also helps avoid accumulation in the process.

Feeding un-pressed mixed MSW to drum pulpers has been attempted but without material success. The inventors believe that a high content of food waste exits the pulper along with the paper pulp and makes the pulp unsuitable as feedstock for pulp and paper mills. The use of an extrusion press before pulping improves the quality of the pulp and produces a marketable pulp that is clean and suitable for various paper products such as cardboard. The combined used of an extrusion press that extracts food waste organics and a pulper the treat the press rejects after organics extraction enables the recovery of valuable paper and other fiber in the form of a marketable pulp. Alternatively, the pulp or a portion of it can be sent to an anaerobic digester. While pulp is not highly digestable on its own, the pulp can be pyrolyzed to produce more digestible gasses or liquids or the pulp co-digested with food waste.

An example of a waste processing system and process flow through the system are shown in FIG. 1.

The combination of upstream materials recycling, food organics extraction and paper pulping can, in at least some cases, results in 60% or more diversion of mixed MSW from landfill.

We claim:

1. A solid waste treatment system comprising,
a press for separating solid waste into a fluidized fraction and rejects; and,
a pulper,
wherein the pulper receives rejects from the press.

2. The system of claim 1 wherein the pulper is a drum pulper or a tub pulper.

3. The system of claim 1 wherein the press comprises a perforated extrusion chamber and a corresponding plunger.

4. The system of claim 1 further comprising an anaerobic digester that receives at least a portion of pulp from the pulper.

5. The system of claim 1 further comprising a pyrolyzer that receives at least a portion of pulp from the pulper.

6. A process for treating solid waste comprising the steps of,
pressing the solid waste to produce a wet fraction and rejects; and,
extracting pulp from the rejects.

7. The process of claim 6 wherein the process of extracting pulp comprises diluting the rejects with heated water, tumbling the diluted rejects and screening the diluted rejects.

8. The process of claim 6 wherein the pulp is extracted using a drum pulper or a tub pulper.

9. The process of claim 6 wherein the step of pressing comprises bursting cells in the waste.

10. The process of claim 6 comprising using the pulp to make a paper product.

11. The process of claim 6 further comprising treating at least a portion of the pulp by anaerobic digestion.

12. The process of claim 6 further comprising treating at least a portion of the pulp by pyrolysis.

* * * * *